(12) United States Patent
Kusaka

(10) Patent No.: US 6,903,764 B2
(45) Date of Patent: Jun. 7, 2005

(54) IMAGE CAPTURING APPARATUS, METHOD FOR CAPTURING IMAGE AND CAMERA

(75) Inventor: Yosuke Kusaka, Yokohama (JP)

(73) Assignee: Nikon Corporation, Tokyo (JP)

(*) Notice: Subject to any disclaimer, the term of this patent is extended or adjusted under 35 U.S.C. 154(b) by 778 days.

(21) Appl. No.: 09/983,858

(22) Filed: Oct. 26, 2001

(65) Prior Publication Data

US 2002/0060741 A1 May 23, 2002

(30) Foreign Application Priority Data

Oct. 27, 2000 (JP) .................................... P2000-328092

(51) Int. Cl.[7] .......................... H04N 5/228; H04N 5/335
(52) U.S. Cl. .............................. 348/208.6; 348/208.13; 348/308; 348/294
(58) Field of Search .......................... 348/208.6, 208.4, 348/208.13, 219.1, 207.99, 308, 302, 299, 314, 241, 294

(56) References Cited

U.S. PATENT DOCUMENTS

| | | | | |
|---|---|---|---|---|
| 5,060,074 A | * | 10/1991 | Kinugasa et al. | ........ 348/208.6 |
| 5,144,449 A | * | 9/1992 | Ishida et al. | ................. 348/302 |
| 5,631,704 A | * | 5/1997 | Dickinson et al. | .......... 348/308 |
| 5,648,815 A | * | 7/1997 | Toba | ...................... 348/207.99 |
| 5,652,664 A | * | 7/1997 | Kusaka et al. | .............. 358/483 |
| 5,729,290 A | * | 3/1998 | Tokumitsu et al. | .......... 348/349 |

FOREIGN PATENT DOCUMENTS

| | | |
|---|---|---|
| JP | 8-223471 A | 8/1996 |
| JP | 11-225284 A | 8/1999 |

* cited by examiner

*Primary Examiner*—Thai Tran
*Assistant Examiner*—Lin Ye
(74) *Attorney, Agent, or Firm*—Oliff & Berridge PLC

(57) ABSTRACT

An image sensor comprises a photoelectric conversion element group and a charge storage element group connected through a plurality of charge transfer routes by achieving a multiplexed relationship. A hand movement detection unit detects a hand movement during an exposure period at the image sensor and generates an unsteady hand movement signal. A sensor control unit selects charge transfer routes so that the electrical charge corresponding to a single position of the subject image is stored at a single charge storage element in correspondence to the extent and the direction of the displacement of the subject image indicated by the hand movement signal.

9 Claims, 18 Drawing Sheets

FIG. 16A

CHARGE STORAGE
ELEMENT GROUP

| B 1 | B 2 | B 3 |
| B 4 | B 5 | B 6 |
| B 7 | B 8 | B 9 |

PHOTOELECTRIC CONVERSION
ELEMENT GROUP

| A 1 | A 2 | A 3 |
| A 4 | A 5 | A 6 |
| A 7 | A 8 | A 9 |

FIG. 16B

CHARGE STORAGE
ELEMENT GROUP

| B 1 | B 2 | B 3 |
| B 4 | B 5 | B 6 |
| B 7 | B 8 | B 9 |

PHOTOELECTRIC CONVERSION
ELEMENT GROUP

| A 1 | A 2 | A 3 |
| A 4 | A 5 | A 6 |
| A 7 | A 8 | A 9 |

IMAGE CAPTURING APPARATUS, METHOD FOR CAPTURING IMAGE AND CAMERA

INCORPORATION BY REFERENCE

The disclosure of the following priority application is herein incorporated by reference;
Japanese Patent Application No. 2000-328092 filed Oct. 27, 2000.

BACKGROUND OF THE INVENTION

1. Field of the Invention

The present invention relates to an image-capturing apparatus, a method for capturing an image and a camera, achieved by employing an image sensor that prevents image blur caused by an unsteady hand movement or the like.

2. Description of Related Art

Technologies for preventing image blur caused by the movement of an unsteady hand or the like occurring during an image sensor exposure period in the known art include an optical vibration-proofing method that prevents image blurring by shifting a portion of the photographic optical system within a plane perpendicular to the optical axis in response to unsteady hand movement or the like. There are problems with regard to such an optical vibration-proofing method in that the apparatus is bound to become large since a mechanical system for shifting the lens and the like is required and in that a great deal of energy must be consumed in order to shift weighty items such as the lens.

A vibration-proofing method in the known art addresses the problems of the optical vibration-proofing method described above by shifting an image sensor within a plane perpendicular to the optical axis in response to an unsteady hand movement or the like to prevent an image blur. For instance, as disclosed in Japanese Laid-Open Patent Publication No. H 8-223471, by employing an image sensor which is smaller in size and weight compared to the lens and the like for shifting, the vibration-proofing mechanism can be miniaturized and the energy consumption during the vibration-proofing operation can be reduced as well compared to the optical vibration-proofing method. However, even in the vibration-proofing method achieved by shifting an image sensor, it is still necessary to provide a mechanical system for shifting the image sensor and to use up energy in order to drive the mechanism. The need to achieve further miniaturization and energy-saving in a vibration-proofing digital camera or the like is particularly important from the standpoint of improving the portability and battery life.

SUMMARY OF THE INVENTION

An object of the present invention is to provide an image-capturing apparatus, an image-capturing method and a camera adopting a new vibration-proofing method that does not require a mechanical system for preventing an image blur due to unsteady hand movement or energy for driving the mechanical system.

In order to achieve the object described above, an image-capturing apparatus according to the present invention comprises a photoelectric conversion element group that captures a subject image with a plurality of photoelectric conversion elements arrayed in a two-dimensional arrangement and generates electrical charges at the individual photoelectric conversion elements, a charge storage element group having a plurality of charge storage elements which store the charges generated at the photoelectric conversion element group, a charge transfer route group that connects the individual photoelectric conversion elements constituting the photoelectric conversion element group to the plurality of the charge storage elements constituting the charge storage element group through different transmission routes, an output circuit that outputs image signals corresponding to the quantities of the charges stored at the charge storage element group, a blur detection circuit that detects a blur occurring at the image-capturing apparatus and outputs a detection signal and a route switching control circuit that selects charge transfer routes at the charge transfer route group in conformance to the detection signal output by the blur detection circuit.

The route switching control circuit may calculate through an arithmetic operation the extent and the direction of a displacement of the subject image occurring on the photoelectric conversion element group in conformance to the detection signal output by the blur detection circuit to select discharge transfer routes so as to connect the photoelectric conversion elements to the charge storage elements based upon the results of the arithmetic operation.

The route switching control circuit may (1) select charge transfer routes so as to connect photoelectric conversion elements to charge storage elements corresponding to the photoelectric conversion elements if the extent of the displacement is smaller than the pitch at which the photoelectric conversion elements are arrayed and (2) select charge transfer routes so as to connect photoelectric conversion elements to charge storage elements at positions reflecting the direction and the extent of the displacement relative to the positions of the charge storage elements corresponding to the photoelectric conversion elements if the extent of the displacement is equal to or larger than the arraying pitch.

In order to achieve the object described above, an image-capturing apparatus according to the present invention comprises a photoelectric conversion element group that captures a subject image with a plurality of photoelectric conversion elements arrayed in a two-dimensional arrangement and generates electrical charges at the individual photoelectric conversion elements, a charge storage element group having a plurality of charge storage elements which store the charges generated at the photoelectric conversion element group, a charge transfer route group that connects the photoelectric conversion elements adjacent to one another in the photoelectric conversion element group to charge storage elements in the charge storage element group corresponding to the adjacent photoelectric conversion elements through different charge transfer routes from one another, an output circuit that outputs image signals corresponding to the quantities of the charges stored at the charge storage element group, a blur detection circuit that detects a blur occurring at the image-capturing apparatus and outputs a detection signal and a route switching control circuit that selects charge transfer routes at the charge transfer route group in conformance to the detection signal output by the blur detection circuit.

The route switching control circuit may calculate through an arithmetic operation the extent of displacement of the subject image occurring on the photoelectric conversion element group along the direction in which the photoelectric conversion elements are provided adjacent to one another in conformance to the detection signal output by the blur detection circuit to select charge transfer routes so as to connect one of the adjacent photoelectric conversion elements to the charge storage element in conformance to the extent of the displacement.

The photoelectric conversion elements may each be constituted of a photodiode, whereas the charge storage elements may each be constituted of a floating diffusion unit. In such a case, the charge transfer routes may each be constituted of a MOS transistor formed between a photodiode and a floating diffusion unit.

The photoelectric conversion elements each constitute a CCD light-receiving unit and the charge storage elements each constitute a CCD storage unit. The charge transfer routes may be constituted of a CCD transfer shift register and, in such a case, the shifting direction and the shifting quantity of the CCD transfer shift register is controlled by the route switching control circuit.

In order to achieve the object described above, in the image-capturing method according to the present invention, a subject image is captured at a photoelectric conversion element group having a plurality of photoelectric conversion elements arrayed in a two-dimensional arrangement, a blur occurring at the photoelectric conversion element group is detected, the extent and the direction of displacement of the subject image occurring on the photoelectric conversion element group are calculated through an arithmetic operation in conformance to the blur, a charge transfer route group that connects the individual photoelectric conversion elements constituting the photoelectric conversion element group to a plurality of charge storage elements constituting a charge storage element group through transmission routes different from one another is switched in correspondence to the extent and the direction of the displacement, electrical charges output from the photoelectric conversion element group are stored at the charge storage element group and image signals are output in correspondence to the quantities of the charges stored at the charge storage element group.

In order to achieve the object described above, the camera according to the present invention includes the image-capturing apparatus disclosed in claim 1 and a photographic optical system that forms a subject image at the photoelectric conversion element group.

BRIEF DESCRIPTION OF THE DRAWINGS

FIG. 16A illustrates charge transfer routes;

FIG. 16B illustrates charge transfer routes;

DESCRIPTION OF PREFERRED EMBODIMENTS

Before explaining the vibration-proofing method adopted in the present invention, the vibration-proofing method in the related art is explained. In the vibration-proofing method in the related art, an exposure operation is performed so as to fix the subject image on the image sensor by shifting the image sensor within a plane perpendicular to the optical axis in response to an unsteady hand movement occurring during the exposure period.

Figure 18:
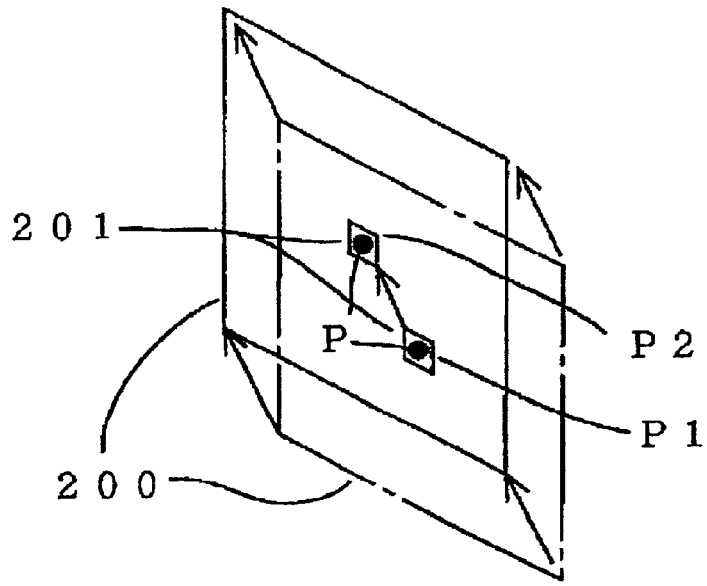
FIG. 18 illustrates the technical concept adopted in the related art.

FIG. 18 is a perspective illustrating the concept of the vibration-proofing method in the related art. An image sensor 200 comprises a plurality of pixels each constituted of a set of a photoelectric conversion element and a charge storage element. The explanation is given here by focusing on a specific pixel 201 among the plurality of pixels. If a point image P on the pixel 201 shifts from a point P1 to a point P2 due to an unsteady hand movement while the image sensor 200 is engaged in an exposure operation, the pixel 201 is enabled to continuously capture the point image P in spite of the unsteady hand movement by moving the entire image sensor 200 to the extent and along the direction matching the extent and the direction of the movement of the point image P. As a result, the quantity of the electrical charge stored at the pixel 201 throughout the exposure period is equalized to the quantity of the electrical charge which would be stored at the pixel 201 if no unsteady hand movement occurred during the exposure operation, thereby eliminating an image blur.

Unlike in the method in the related art, in the vibration-proofing method of the present invention, the photoelectric conversion elements and the charge storage elements are not provided in fixed pairs and charge storage elements where the charges generated at the photoelectric conversion elements are stored are switched in response to an unsteady hand movement occurring during the exposure period to obtain an image without a blur attributable to the unsteady hand movement.

Figure 19:
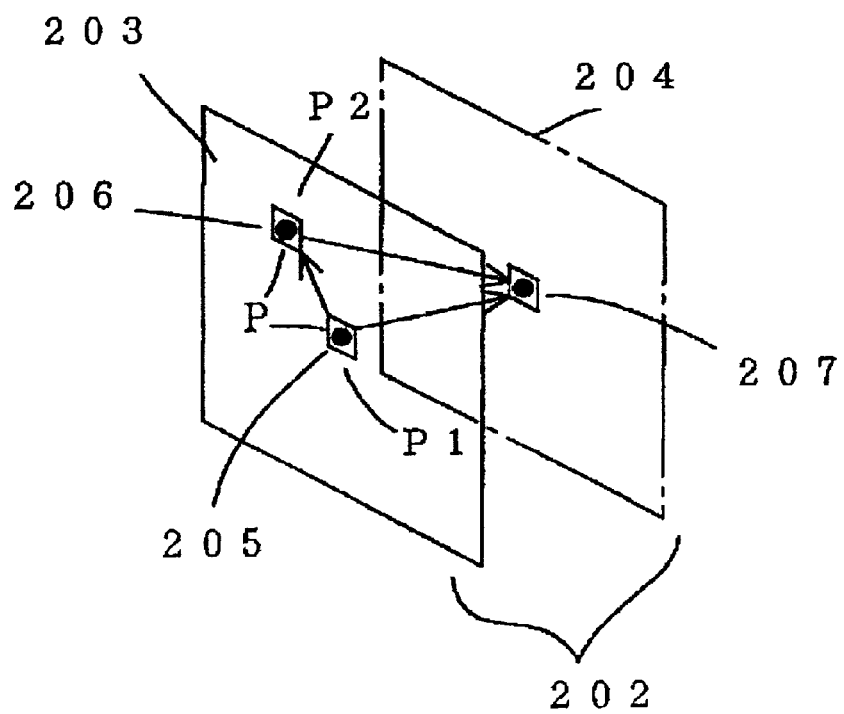
FIG. 19 illustrates the technical concept of the present invention.

FIG. 19 presents a perspective illustrating the concept of the vibration-proofing method achieved in the present invention. An image sensor 202 comprises a photoelectric conversion element group 203 and a charge storage element group 204. The explanation is now given by focusing on a single photoelectric conversion element 205 in the photoelectric conversion element group 203. If no unsteady hand movement occurs during an exposure period, the electrical charge generated at the photoelectric conversion element 205 is stored at a charge storage element 207. If, on the other hand, the point image P on the photoelectric conversion element 205 moves from the point P1 to the point P2 due to an unsteady hand movement while the image sensor 202 is engaged an exposure operation, a photoelectric conversion element 206 at the position P2 captures the point image P. In this situation, if the electrical charge generated at the photoelectric conversion element 206 is stored at the charge storage element 207, the electrical charge originating from the point image P is continuously stored at the charge storage element 207 in spite of the unsteady hand movement occurring during the exposure period. As a result, the quantity of the charge stored at the charge storage element 207 throughout the exposure period is equalized to the quantity of the electrical charge that would be stored at the charge storage element 207 if no unsteady hand movement occurred during the exposure period, thereby eliminating image blur. In other words, it is possible to prevent an image blur without having to mechanically shift the image sensor in response to the unsteady hand movement simply by electrically switching the charge transfer routes from the photoelectric conversion elements to the charge storage elements in response to the unsteady hand movement.

Figure 1:
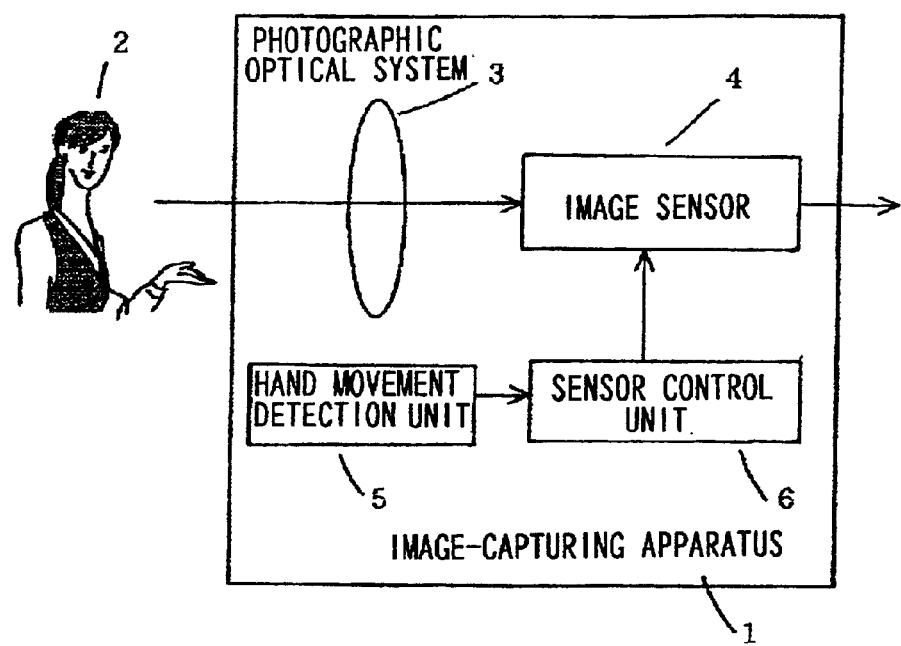
FIG. 1 is a block diagram illustrating the structure adopted in an embodiment of the present invention.

The following is an explanation of an embodiment of the present invention, given in reference to the drawings. FIG. 1 is a block diagram illustrating the concept of an image-capturing apparatus according to the present invention achieved by adopting the new vibration-proofing method described above. In FIG. 1, an image-capturing apparatus 1 includes a photographic optical system 3, an image sensor 4, a hand movement detection unit 5 and a sensor control unit 6. The photographic optical system 3 forms an image of a subject 2 on the image sensor 4. The image sensor 4 comprises a photoelectric conversion element group assuming a two-dimensional array configuration, a charge storage element group where electrical charges generated at the photoelectric conversion element group are stored and an output circuit that outputs image signals corresponding to the quantities of the charges stored at the charge storage element group. The photoelectric conversion element group and the charge storage element group are connected through multiplexed relationships via charge transfer routes. Namely, a plurality of adjacent photoelectric conversion elements are linked to a single charge storage element and a single photoelectric conversion element is linked to a plurality of adjacent charge storage elements. The length of an exposure period (the charge storage period) at the photoelectric conversion element group is controlled in conformance to the brightness of the subject image and image signals corresponding to the subject image are output from the output circuit.

The hand movement detection unit 5 detects an unsteady hand movement at the image-capturing apparatus during the exposure (image-capturing) period at the photoelectric conversion element group of the image sensor 4. The hand movement detection unit 5, which may be constituted of, for instance, an angular speed sensor, generates a hand movement signal which changes over time in correspondence to the detected hand movement.

The sensor control unit 6 controls the operations of the image sensor 4. The sensor control unit 6 implements real-time control on the charge transfer routes between the photoelectric conversion elements and the charge storage elements in conformance to the hand movement signal during the exposure period. It outputs a control signal for the image sensor 4 so as to the electrical charge generated at a given position of the subject image is stored at a specific, single charge storage element. As a result, the image sensor 4 is allowed to output image signals which do not manifest any image blur when the exposure is completed.

Figure 2:
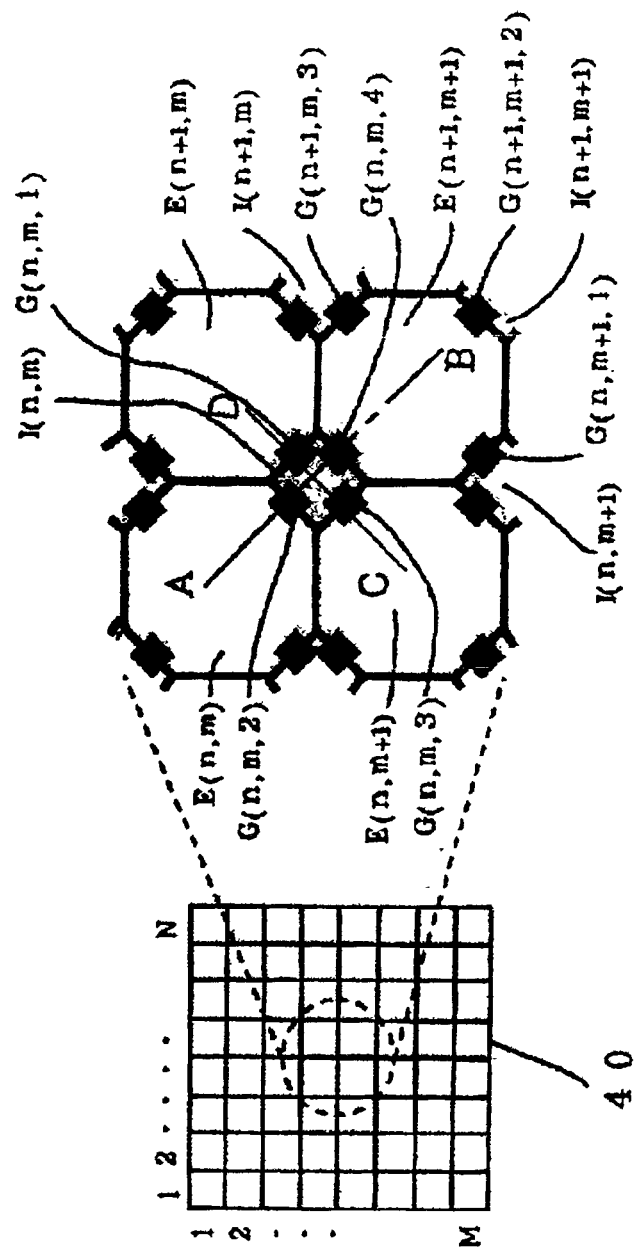
FIG. 2 illustrates the arrangement of the photoelectric conversion elements and the charge storage elements adopted at the image sensor.

FIG. 2 shows an example of the structure assumed in the image sensor 4 having a charge transfer route switching function. In FIG. 2, an image sensor 40 is constituted of N×M photoelectric conversion elements E (i, j) and N×M charge storage elements I (i, j). Adjacent photoelectric conversion elements E (n, m), E (n+1, m), E (n, m+1) and E (n+1, m +1) are connected with a single charge storage element I (n, m) via charge transfer gates G(n, m, 2), G(n, m, 1), G(n, m, 3) and G(n, m, 4). In addition, a single photoelectric conversion element E (n+1, m+1) is connected to adjacent charge storage elements I (n, m), I (n+1, m), I (n, m+1) and I (n+1, m+1) via charge transfer gates G(n, m, 4), G(n+1, m, 3), G(n, m+1, 1) and G(n+1, m+1, 2).

Figure 3:
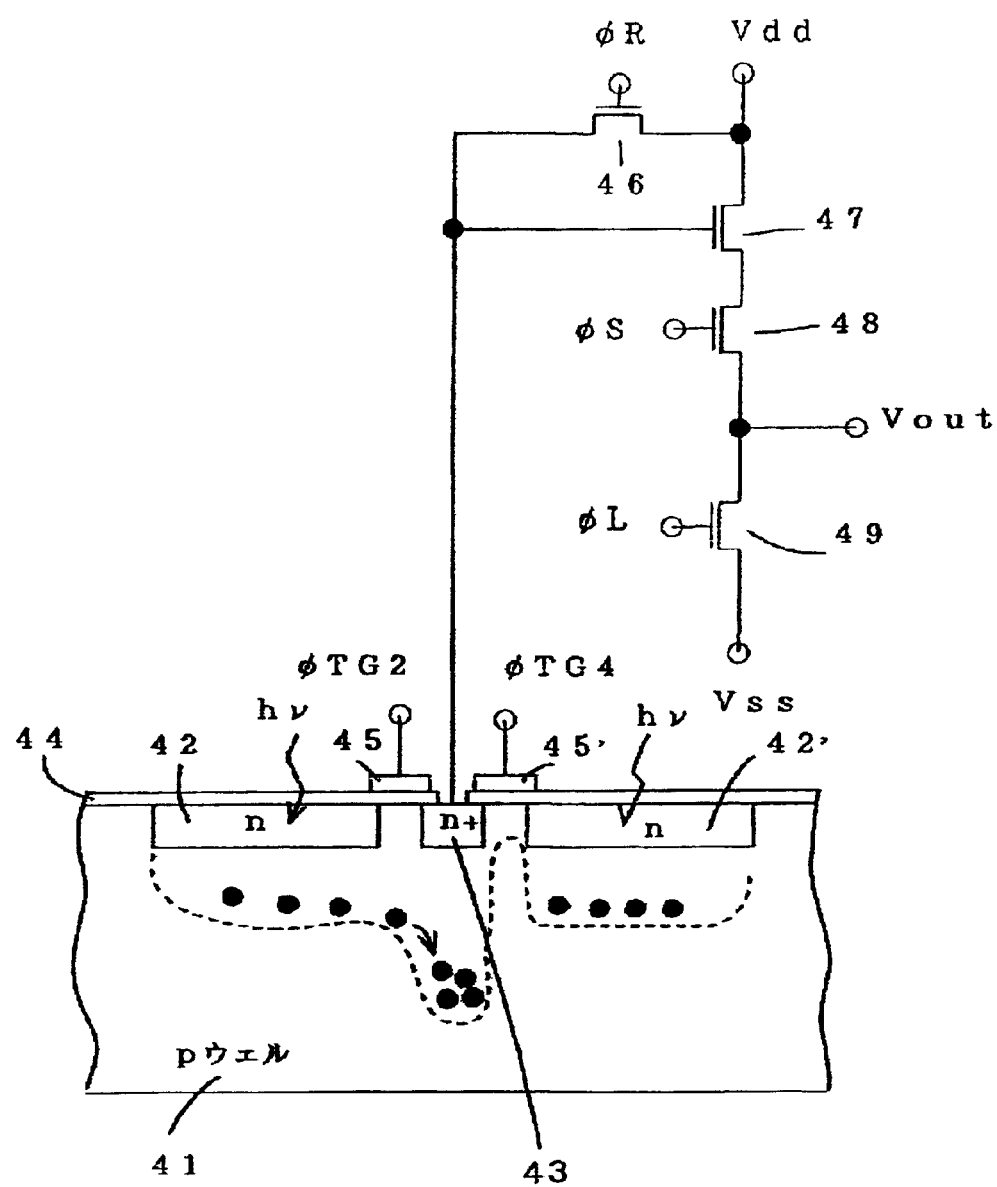
FIG. 3 is a sectional view of the structure adopted in the image sensor.

FIG. 3 is a sectional view taken through AB in FIG. 2. In FIG. 3, reference numeral 41 indicates a p-type well, reference numerals 42 and 42' each indicate an n layer, reference numeral 43 indicates an n+ floating diffusion unit (FD), reference numeral 44 indicates a gate oxide film, reference numerals 45 and 45' each indicate poly-Si constituting a MOS transistor for transfer switch, reference numeral 46 indicates a MOS transistor for reset, reference numeral 47 indicates a MOS transistor for source follower type amplifier, reference numeral 48 indicates a MOS transistor for vertical selection switch and reference numeral 49 indicates a load MOS transistor with a source follower type.

The n layers 42 and 42' and the p-type well 41 form a photodiode. These photodiodes generate electrical charges (indicated by the filled circles) in correspondence to the quantity of the incident light. If the transfer switch of the MOS transistor, which includes the poly-Si 45 has been set in an ON state in response to a transfer control signal $\phi G2$, the electrical charge generated at the n layer 42 flows into the FD unit 43. If, on the other hand, though transfer switch of the MOS transistor which includes the poly-Si 45' has been turned off in response to a transfer control signal $\phi TG4$, the electrical charge generated at the n layer 42' cannot flow into the FD unit 43. By implementing ON/OFF control on the transfer control signals $\phi TG2$ and $\phi TG4$ in conformance to the hand movement signal, the electrical charge generated at either of the adjacent photodiodes 42 and 42' can be selectively stored at the FD unit 43. It is ensured that the FD unit stores the electrical charge generated at a single position of the subject.

Although not shown, a cross sectional view taken along CD in FIG. 2 would be identical to the sectional view in FIG. 3, and would include a transfer switch of a MOS transistor (not shown) which is turned ON/OFF in response to a transfer control signal $\phi TG1$ and a transfer switch MOS transistor (not shown) which is turned ON/OFF in response to a transfer control signal $\phi TG3$.

In this structure, the transfer control signal $\phi TG1$ is connected to all the charge transfer gates G (i, j, 1), the transfer control signal $\phi TG2$ is connected to all the charge transfer gates G (i, j, 2), the transfer control signal $\phi TG3$ is connected to all the charge transfer gates G (i, j, 3) and the transfer control signal $\phi TG4$ is connected to all the charge transfer gates G (i, j, 4).

At the start of an exposure operation, all the transfer switch of the MOS transistors are first turn on to allow the charges stored at the photodiodes to flow into the FD units 43. The charges at the FD units 43 are reset when the reset switch of the MOS transistors 46 are turned on in response to a reset signal $\phi R$. In addition, a signal output line Vout is reset when the load MOS transistor 49 is turned on by a control pulse $\phi L$.

During the exposure period, a single transfer switch of the MOS transistor is turned on with the remaining transfer switch of the MOS transistors set in an OFF state. Switching control is implemented on the transfer switch of the MOS transistors so as to allow one of the transfer switch of the MOS transistors alone to enter an ON state in the event of an unsteady hand movement in conformance to the resulting hand movement signal. Once the exposure period is over, all the transfer switch of the MOS transistors are turned off. The electrical charge stored at the FD unit 43 is output as a voltage signal through the signal output line Vout as the source follower type amplifier of the MOS transistor 47 becomes turned on in correspondence to the stored charge at the FD unit 43 after the vertical selection switch of the MOS transistor 48 is turned on in response to a horizontal selection signal φS.

Figure 4:
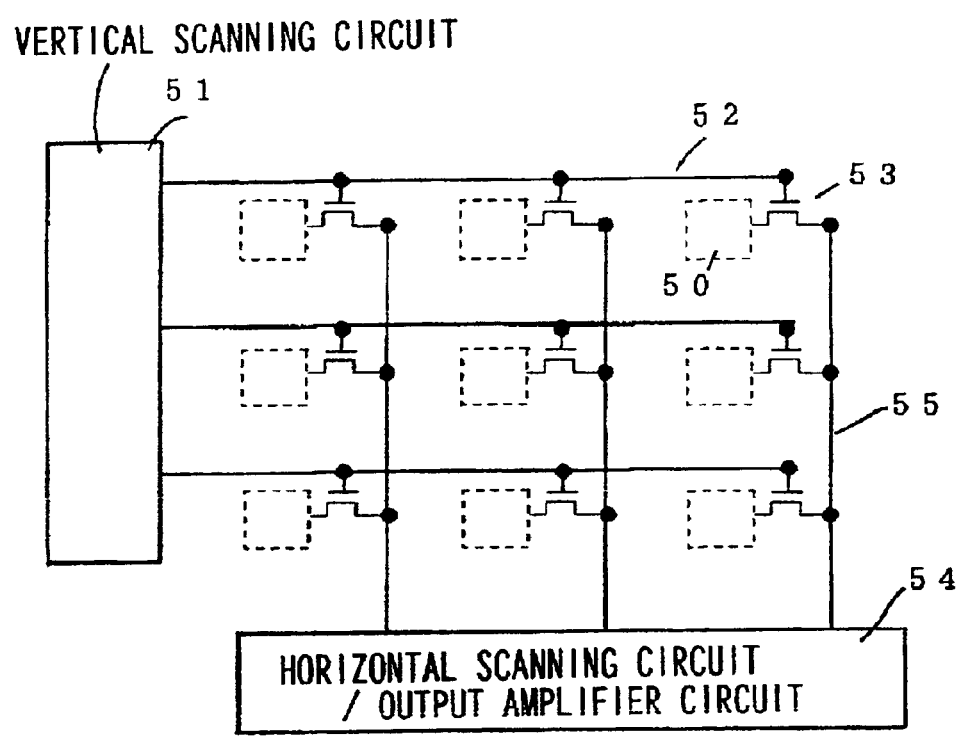
FIG. 4 shows the overall structure of the image sensor.

FIG. 4 shows the overall structure of the image sensor adopting the structure shown in FIGS. 2 and 3. In FIG. 4, the portions enclosed by dotted lines 50 each indicate an FD unit constituting a charge storage element which corresponds to the FD unit 43 in FIG. 3. Reference numeral 51 indicates a vertical scanning circuit, reference numeral 52 indicates a vertical scanning line, reference numeral 53 indicates a vertical selection switch and reference numeral 54 indicates a horizontal scanning circuit/output amplifier circuit. By performing a synchronous scanning operation at the vertical scanning circuit 51 and the horizontal scanning circuit/output amplifier circuit 54, image signals corresponding to the quantities of the charges stored at the FD units 50 are sequentially output.

Figure 5:
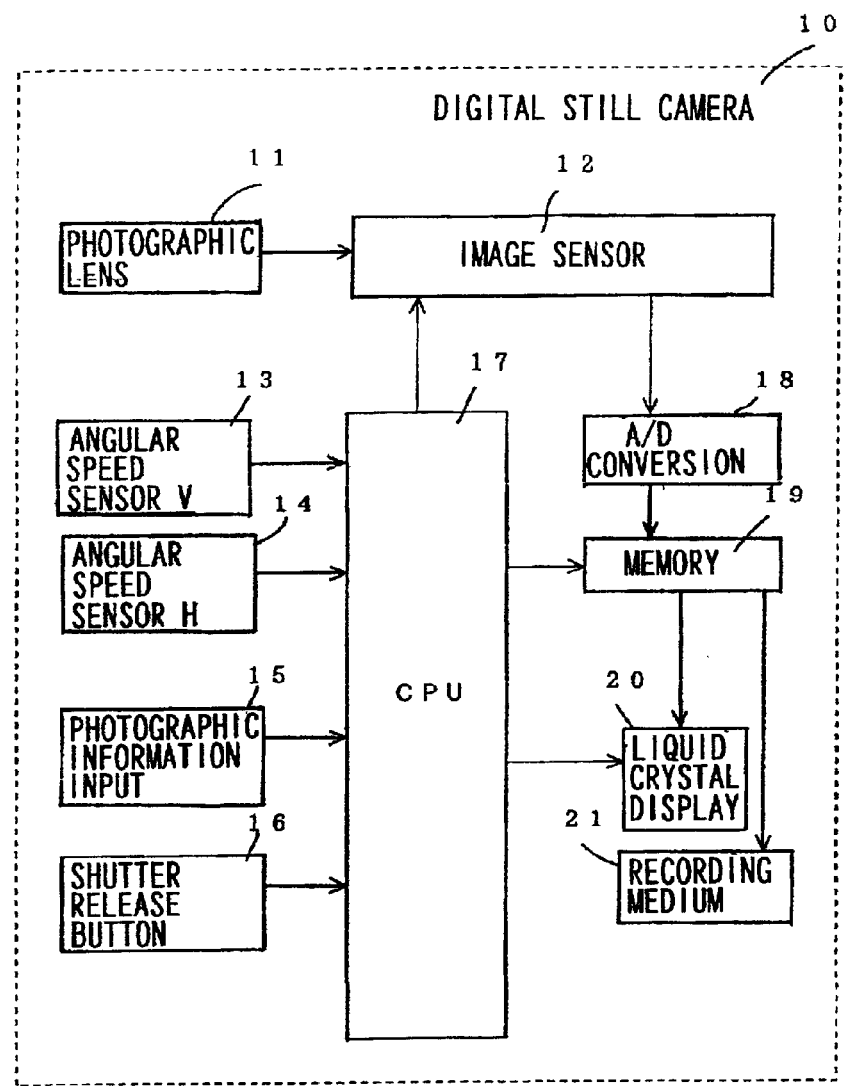
FIG. 5 is a block diagram of the structure achieved in a digital camera adopting the present invention.

FIG. 5 presents a block diagram of a digital still camera 10 having the image sensor 12 illustrated in FIGS. 2, 3 and 4. A subject image formed at a photographic lens 11 undergoes photoelectric conversion at the image sensor 12. Image signals output from the image sensor 12 are converted to digital image signals at an A/D conversion circuit 18 and are then stored in a volatile memory 19 such as a RAM. The image signals stored in the memory 19 are displayed as an image at a liquid crystal display device 20 and are also recorded into a nonvolatile recording medium 21 which may be a compact flash (a registered trademark of Sundisk Corp. USA: No. 4080488) memory. A CPU 17 controls the image-capturing operation, the storage operation, the display operation and the recording operation described above.

Figure 20:
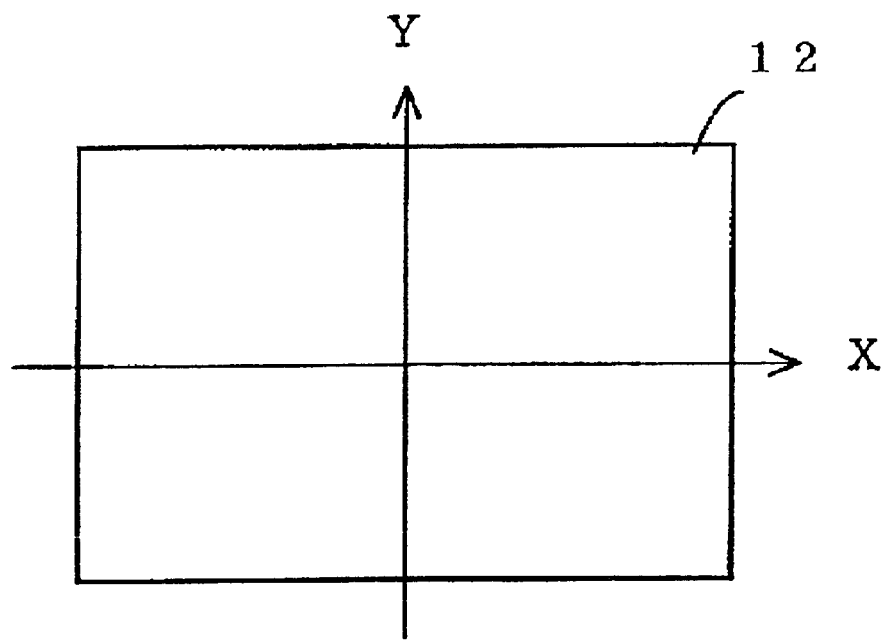
FIG. 20 illustrates the coordinate system of the image sensor.

An angular speed sensor V13 and an angular speed sensor H14 are hand movement detection sensors provided to detect an unsteady hand movement and the like occurring at the digital still camera 10. The angular speed sensor V13 and the angular speed sensor H14 are each positioned perpendicular to the optical axis of the photographic lens 11. The sensors V13 and H14 perform real-time detection of the angular speed at the photographic lens 11 as angular speeds around two axes perpendicular to each other and provide the detection outputs as two angular speed signals to the CPU 17. When the photoelectric conversion elements at the image sensor 12 are arrayed along an X axis and a Y axis as shown in FIG. 20, the angular speed sensor V13 and the angular speed sensor H14 are provided so as to enable them to detect the angular speeds around the X axis and the Y axis respectively.

A photographic information input device 15 in FIG. 5 inputs information regarding the photographing operation such as the subject brightness, the aperture value at the photographic lens and the sensitivity setting to the CPU 17. Based upon the information thus input, the CPU 17 determines the length of time over which the charges are to be stored (the length of the exposure period) at the image sensor 12. A shutter release button 16 which is a member operated by the photographer during the photographing operation generates a shutter release signal when it is operated by the photographer. It is to be noted that the digital still camera 10 is provided with an optical finder (not shown) to allow the photographer to observe the subject through the optical finder.

When a shutter release signal is input through the shutter release button 16 in the structure described above, the CPU 17 starts the exposure operation at the image sensor 12, detects any shaking motion occurring at the photographic lens 11 during the exposure period based upon the angular speed signals provided by the angular speed sensor V13 and the angular speed sensor H14 and generates a hand movement signal that represents the displacement of the subject image on the image sensor 12 caused by the shaking motion. The CPU 17 detects the direction and the extent of the displacement of the subject image from the hand movement signal thus generated and outputs a charge transfer route switching control signal (i.e., ON/OFF signal of the transfer switch of the MOS transistor) to the image sensor 12 based upon the results of the detection. At the image sensor 12, the charge transfer routes connecting the photoelectric conversion element group and the charge storage element group are switched during the exposure period in conformance to the control signal. When the exposure period is over, the CPU 17 outputs an exposure end control signal to the image sensor 12. The image sensor 12 ends the exposure operation in conformance to the exposure end control signal and also outputs image signals by scanning the charge storage element group.

Figure 6:
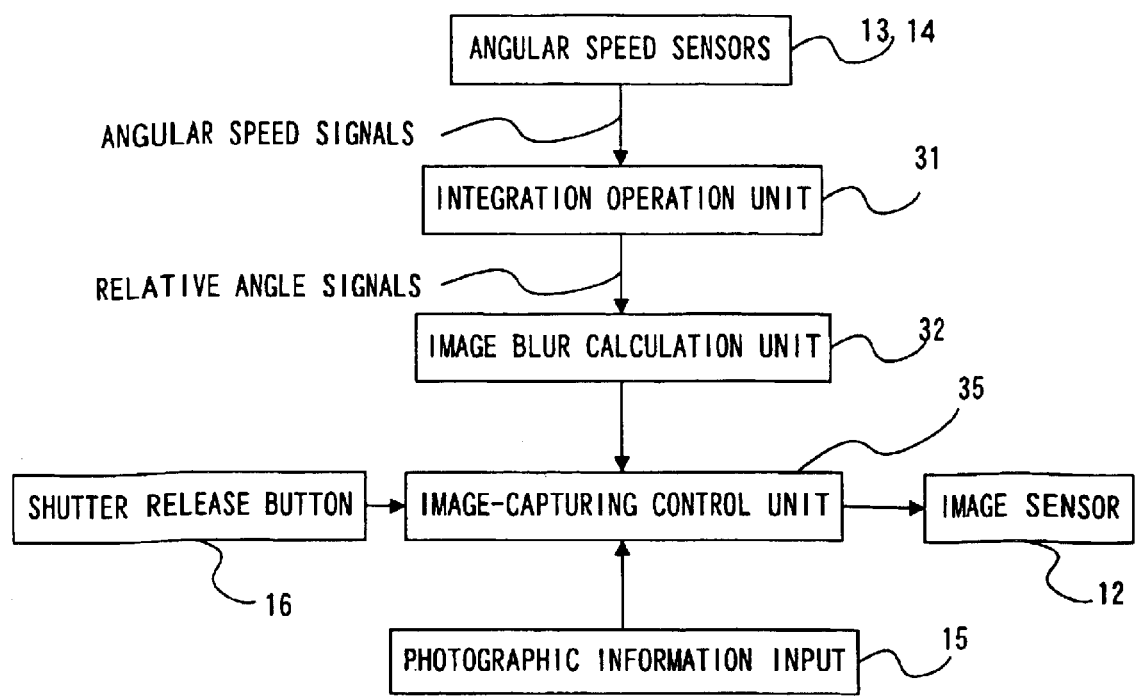
FIG. 6 is a block diagram showing the structure achieved at the CPU and at the periphery of the CPU.

FIG. 6 presents a block diagram showing the structure assumed in the CPU 17 in FIG. 5 and at its periphery in further detail. Now, in reference to FIG. 6, a detailed explanation is given on the charge transfer route control implemented on the image sensor in response to an unsteady hand movement.

Figure 7:
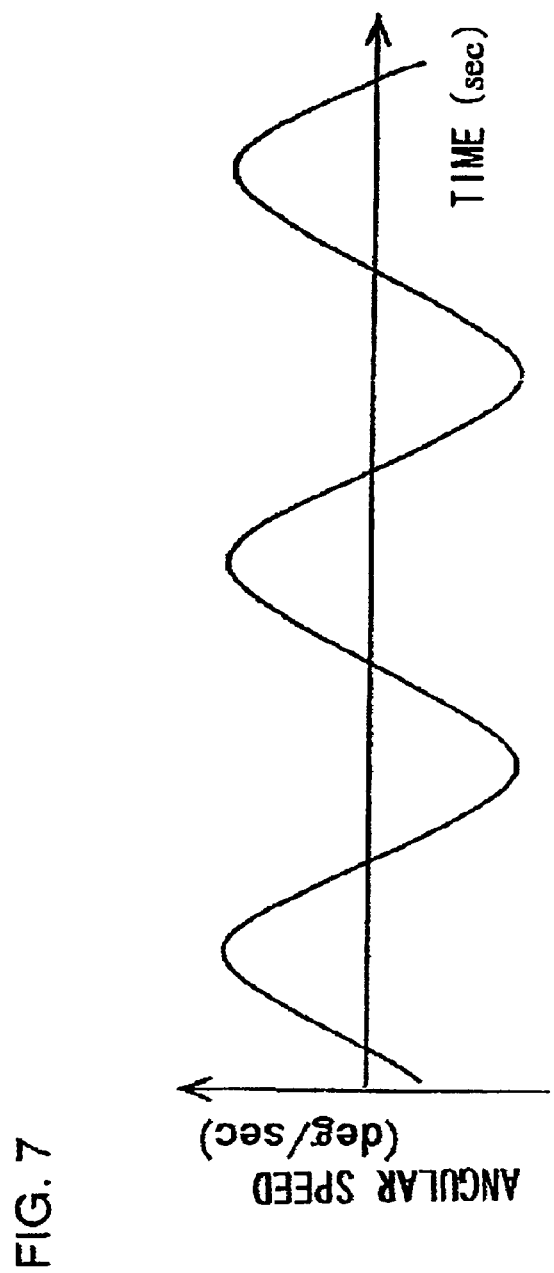
FIG. 7 shows the waveform of an angular speed signal.
Figure 8:
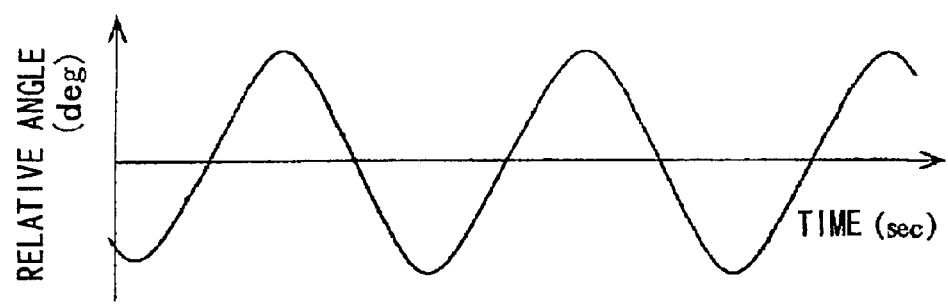
FIG. 8 shows the waveform of a relative angle signal.

The angular speed sensor V13 and the angular speed sensor H14 in FIG. 6 generate angular speed signals corresponding to an unsteady hand movement to which the digital still camera 10 is subjected. FIG. 7 shows a one-dimensional angular speed signal generated that is represented as a sine wave when an unsteady hand movement occurs. This angular speed signal undergoes A/D conversion over predetermined sampling intervals and thus becomes digital data. The angular speed signal having been converted to digital data is then integrated at an integration operation unit 31 (see FIG. 6) and is converted to a relative angle signal (which indicates a relative angular displacement minus the integration constant). The relative angle signal is provided to an image blur arithmetic operation unit 32. FIG. 8 shows the relative angle signal obtained by converting the relative angular speed signal shown in FIG. 7.

Figure 9:
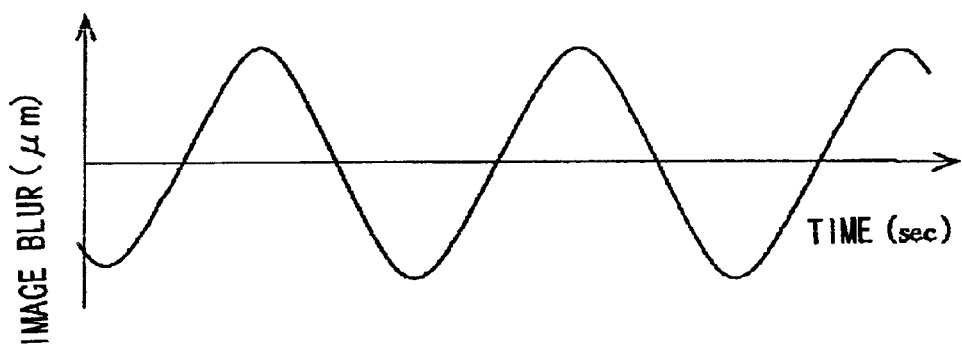
FIG. 9 shows the waveform of an unsteady hand movement signal.

The image blur arithmetic operation unit 32 converts the relative angle signal to a hand movement signal indicating the displacement of the subject image on the image sensor 12. The conversion to obtain the hand movement signal may be implemented by using, for instance, the following equations (1) and (2).

$$X = K \times F \times \tan\theta y \quad (1)$$

$$Y = K \times F \times \tan\theta x \quad (2)$$

with X representing the extent of the displacement of the subject image occurring along the direction in which the X axis extends, Y representing the extent of the displacement of the subject image occurring along the direction in which the Y axis extends, K representing a constant, F representing the focal length of the photographic lens input from the photographic information input device 15, θx representing the value indicated by the relative angle signal corresponding to the X axis and θy representing the value indicated by the relative angle signal corresponding to the Y axis. The focal length of the photographic lens is used in equations (1) and (2), since the extents of the displacement that a subject image undergoes are in proportion to the focal length. FIG. 9 shows a hand movement signal (one-dimensional) resulting from the conversion implemented by using equation (1) or (2)

Figure 10:
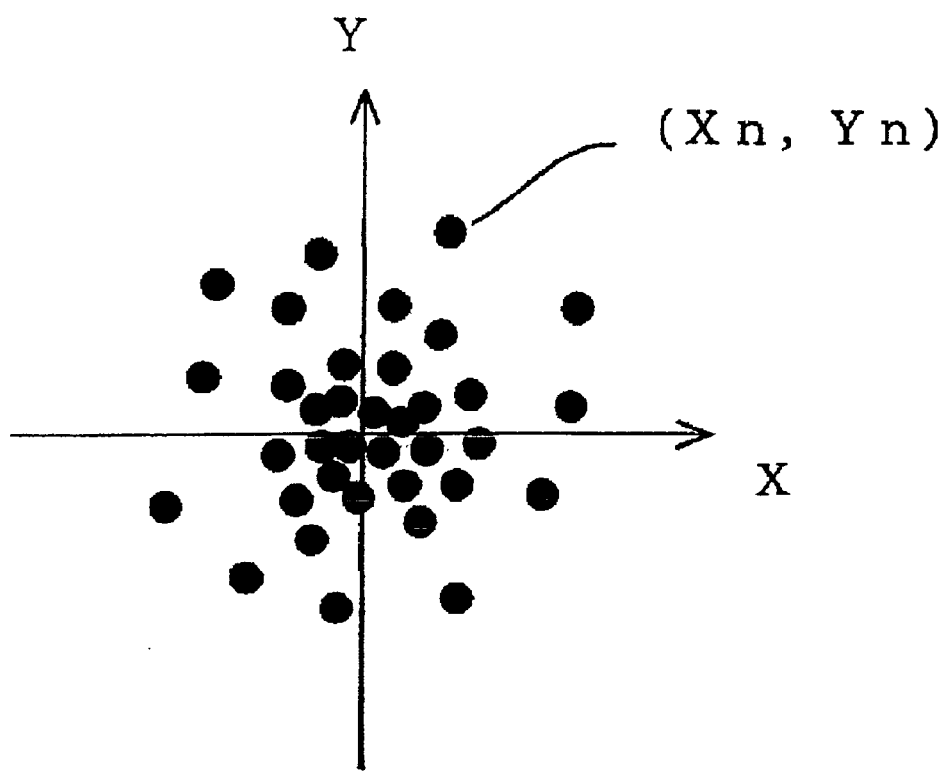
FIG. 10 is provided to facilitate an explanation of the unsteady hand movement signals.

FIG. 10 two-dimensionally illustrates the data in a hand movement signal. In FIG. 10, the data values indicated by the hand movement signal sampled over the predetermined intervals during the exposure period are shown as filled circles. In the explanation, (Xk, Yk) represents the sampling values obtained by sampling the hand movement signal for the kth time during the exposure period. In addition, the first sampling value from the hand movement signal obtained by sampling the hand movement signal for the first time after the exposure start is set as a reference value (0, 0). The hand movement signal obtained as described above is then provided to an image-capturing control unit 35.

The shutter release button 16 transmits a shutter release signal in response to an operation by the photographer to the image-capturing control unit 35. The image-capturing control unit 35 calculates through an arithmetic operation the length of the exposure period (the length of time over which the charges are to be stored) at the image sensor 12 based upon the subject brightness, the sensitivity setting at the image sensor 12 and the aperture value at the photographic lens 11 obtained from the photographic information input device 15 and also outputs a control signal for starting the charge storage in response to the shutter release signal to the image sensor 12. In addition, the image-capturing control unit 35 outputs a signal for controlling the charge transfer routes in conformance to the values indicated by the hand movement signal generated during the exposure period to the image sensor 12, ends the charge storage once the charge storage period reaches the end of the exposure period calculated in advance and outputs a control signal for outputting image signals to the image sensor 12.

Figure 11:
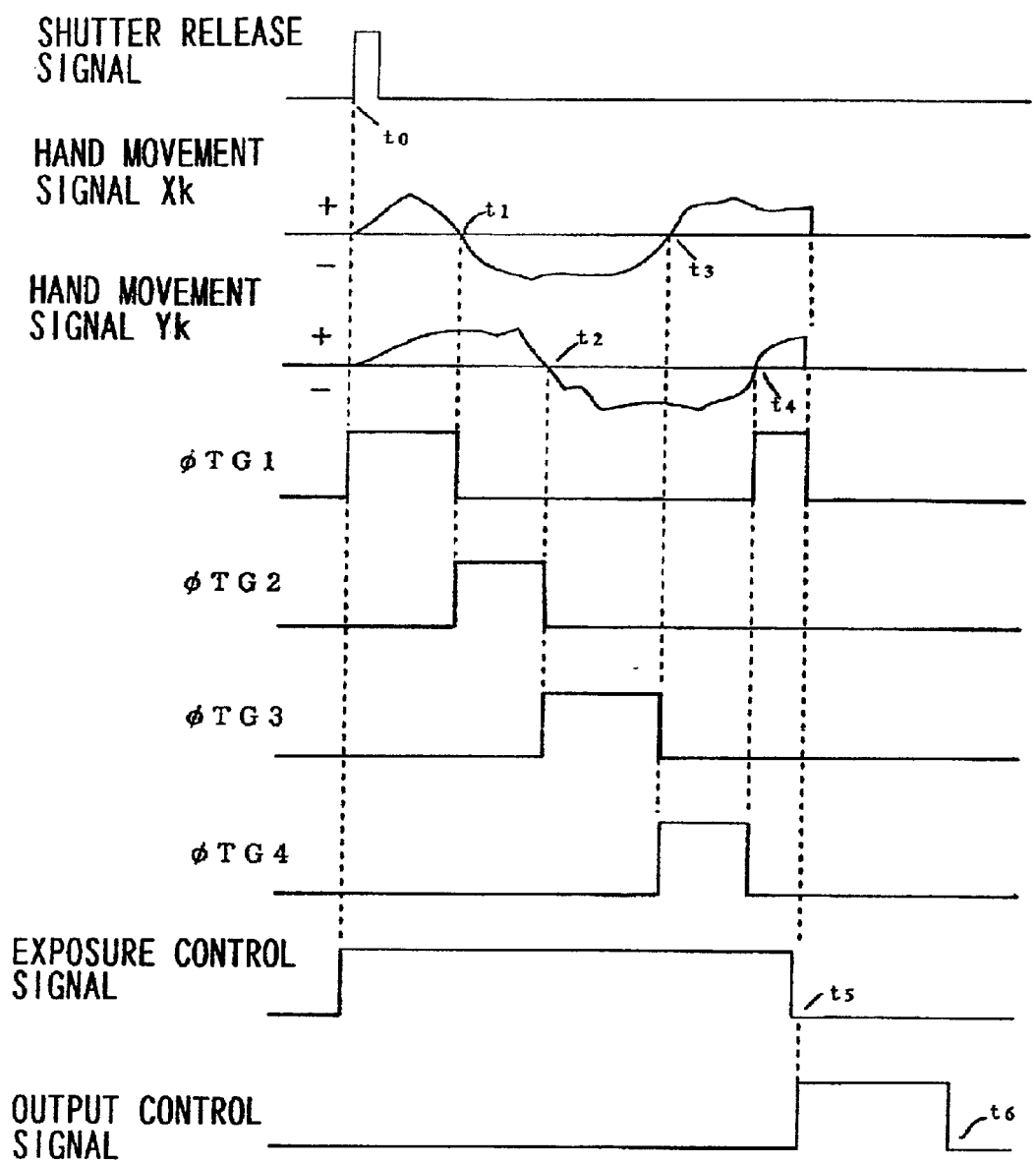
FIG. 11 is a timing chart of the control signals used at the image sensor.

FIG. 11 presents a diagram of the signal waveforms indicating the operation achieved at the image-capturing control unit 35. When the shutter release signal is input at a time point to, sampling of the hand movement signal Xk and the hand movement signal Yk starts. It is to be noted that in FIG. 11, the hand movement signal Xk and the hand movement signal Yk are each shown as a continuous waveform relative to (0, 0) representing the value indicated by them at the time of the shutter release signal input. When the exposure control signal is turned on in response to the shutter release signal input, the photodiodes and the FD units at the image sensor 12 are reset and a charge storage starts at the image sensor 12.

During the period elapsing from the time point t0 to a time point t1, the values indicated by the hand movement signal Xk and the hand movement signal Yk are both positive, and the displacement of the subject image manifests in the first quadrant (the upper right area) in FIG. 10. In this case, the transfer control signal øTG1 is turned on to transfer the charges to the lower left charge storage elements (FD units). During the period elapsing from the time point t1 to a time point t2, the value indicated by the hand movement signal Xk is negative and the value indicated by the hand movement signal Yk is positive and the displacement of the subject image manifests in the second quadrant (the upper left area) in FIG. 10. In this case, the transfer control signal øTG2 is turned on to transfer the charges to the lower right charge storage elements (FD units). During the period elapsing from the time point t2 to a time point t3, the values indicated by the hand movement signal Xk and the hand movement signal Yk are both negative and the displacement of the subject image manifests in the third quadrant (the lower left area) in FIG. 10. In this case, the transfer control signal øTG3 is turned on to transfer the charges to the upper right charge storage elements (FD units). During the period elapsing from the time point t3 to a time point t4, the value indicated by the hand movement signal Xk is positive and the value indicated by the hand movement signal Yk is negative, and the displacement of the subject image manifests in the fourth quadrant (the lower right area) in FIG. 10. Thus, the transfer control signal φTG4 is turned on to transfer the charges to the upper left charge storage elements (FD units) in this case. During the period elapsing from the time point t4 to a time point t5, the values indicated by the hand movement signal Xk and the hand movement signal Yk are both positive, and the displacement of the subject image manifests in the first quadrant (the upper right area) in FIG.10 again. Accordingly, a transfer control signal øTG1 is turned on to transfer the charges to the lower left charge storage elements (FD units) again.

When the exposure period ends at the time point t5, all the transfer control signals φTG1, φTG2, φTG3 and φTG4 are turned off, the exposure control signal is turned off and the output control signal is turned on. As a result, the charges stored at the FD units are scanned and an output of the image signals starts. When the scanning of all the FD units is completed and the output control signal is turned off at a time point t6, the image signal output is completed.

Figure 12:
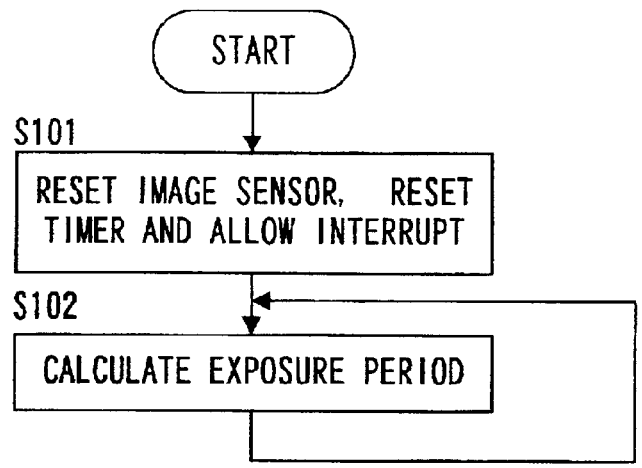
FIG. 12 presents a flowchart of CPU operation processing.
Figure 13:
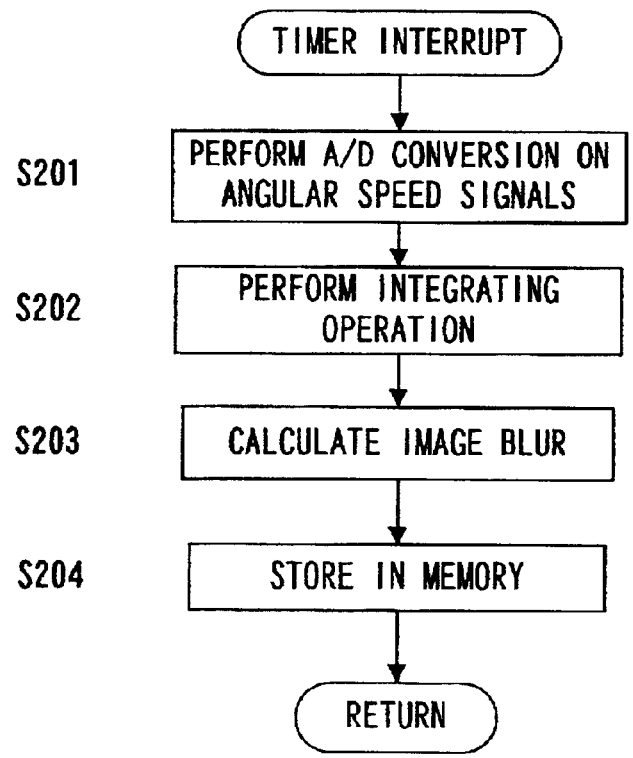
FIG. 13 presents a flowchart of CPU operation processing.
Figure 14:
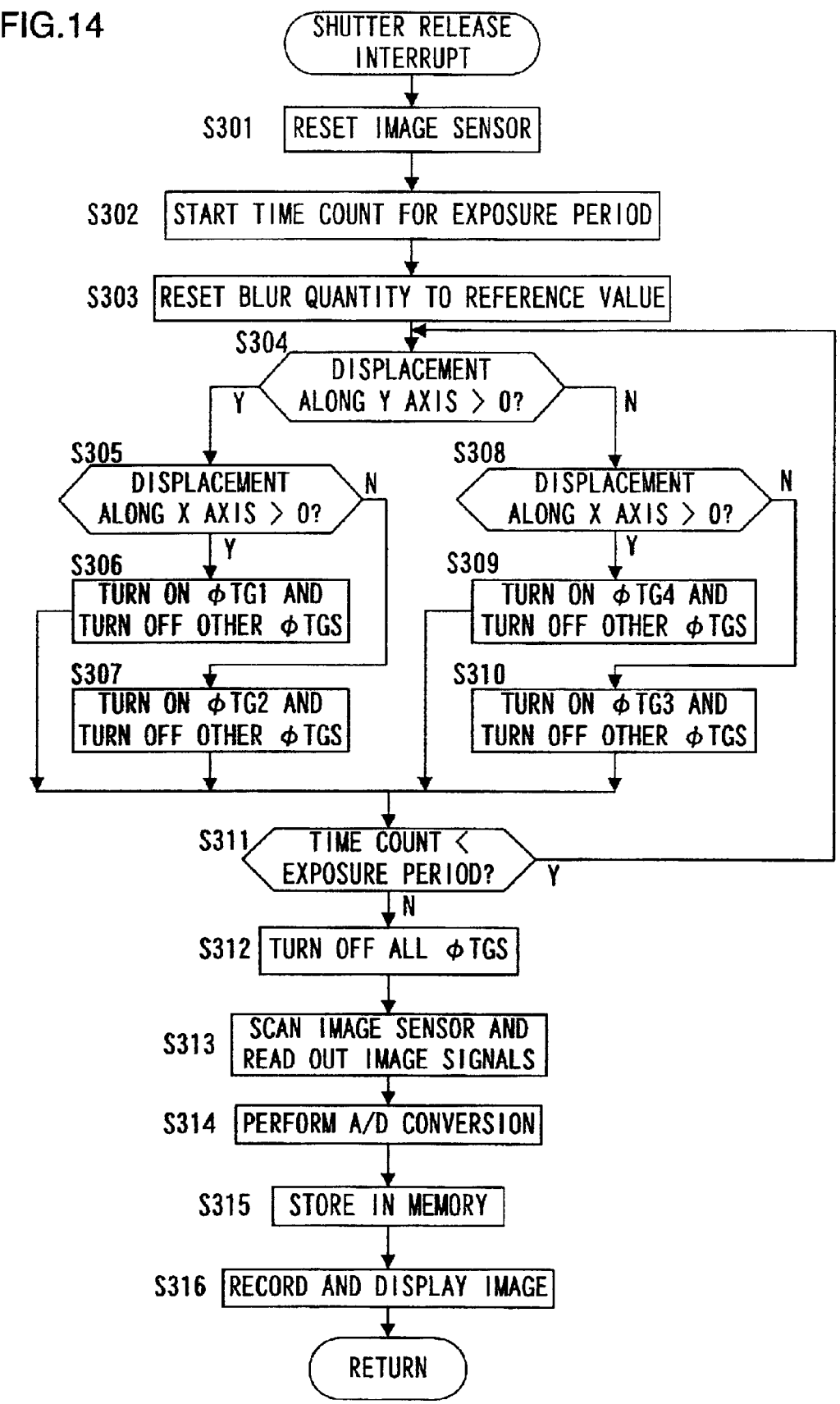
FIG. 14 presents a flowchart of CPU operation processing.

FIGS. 12, 13 and 14 present flowcharts of the program processing executed at the CPU 17 as explained in reference to FIG. 5. FIG. 12 shows the main program processing executed at the CPU 17. FIG. 13 shows the timer interrupt program processing implemented to perform A/D conversion on the angular speed signals over predetermined time intervals. FIG. 14 shows the shutter release interrupt program processing which is started in response to a shutter release signal. While the execution of the main program processing shown in FIG. 12 is in progress, the main program processing is interrupted as necessary by the timer interrupt processing in FIG. 13 or the shutter release interrupt processing in FIG. 14.

The program processing in FIG. 12 is started by the CPU 17 as the power is turned on at the digital still camera 10. In step S101, the CPU 17 first resets the operation of the image sensor 12 and also resets the timer and the like, and then a timer interrupt and a shutter release interrupt become enabled. In step S102, the CPU 17 calculates through an arithmetic operation the length of time over which the electrical charges are to be stored at the image sensor 12 based upon the information (the subject brightness, the pixel sensitivity, the aperture value and the like) that is necessary when determining the length of the charge storage period (the exposure period) at the image sensor 12. The arithmetic processing in step S102 is sequentially repeated.

In step S201 in FIG. 13, the CPU 17 performs A/D conversion on the angular speed signals and stores the signals resulting from the conversion into the memory. In step S202, the CPU 17 calculates relative angle signals by integrating the angular speed signals stored in the memory up to the most recent data. In step S203, the CPU 17 obtains through an arithmetic operation the hand movement signal based upon the relative angle signals by using equations (1) and (2), and then the operation proceeds to step S204. The CPU 17 ends the processing in FIG. 13 once the calculated hand movement signals are stored in the memory in step S204, and the operation returns to the processing shown in FIG. 12.

In step S301 in FIG. 14, the CPU 17 turns on the exposure control signal to reset the image sensor 12, thereby starting an exposure operation at the image sensor 12. In step S302, the CPU 17 starts the time count for the exposure period and then the operation proceeds to step S303. In step S303, the CPU 17 resets the hand movement signal Xi and the hand movement signal Yi to the reference value (0, 0).

In step S304, the CPU 17 judges a decision as to whether or not the value indicated by the hand movement signal Yi representing the displacement along the Y axis is positive. An affirmative decision is made by the CPU 17 in step S304 if the value indicated by the hand movement signal Yi is positive, and in this case the operation proceeds to step S305, whereas a negative decision is made by the CPU 17 in step S304 if the value indicated by the hand movement signal Yi is not positive and in such an event, the operation proceeds to step S308. In step S305, the CPU 17 judges as to whether or not the value indicated by the hand movement signal Xi representing the displacement along the X axis is positive. An affirmative judgement is made by the CPU 17 in step S305 if the value indicated by the hand movement signal Xi is positive, and in this case the operation proceeds to step S306, whereas a negative judgement is made by the CPU 17 in step S305 if the value indicated by the hand movement signal Xi is not positive and in such an event, the operation proceeds to step S307. In step S306, the CPU 17 turns on the transfer control signal $\phi$TG1 and also turns off the transfer control signals other than the transfer control signal $\phi$TG1 before the operation proceeds to step S311. In step S307, the CPU 17 turns on the transfer control signal $\phi$TG2 and also turns off the transfer control signals other than the transfer control signal $\phi$TG2 before the operation proceeds to step S311.

In step S308, the CPU 17 judges as to whether or not the value indicated by the hand movement signal Xi representing the displacement along the X axis is positive. An affirmative judgement is made by the CPU 17 in step S308 if the value indicated by the hand movement signal Xi is positive, and in this case the operation proceeds to step S309, whereas a negative judgement is made by the CPU 17 in step S308 if the value indicated by the hand movement signal Xi is not positive and in such an event, the operation proceeds to step S310. In step S309, the CPU 17 turns on the transfer control signal $\phi$TG4 and also turns off the transfer control signals other than the transfer control signal $\phi$TG4 before the operation proceeds to step S311. In step S310, the CPU 17 turns on the transfer control signal $\phi$TG3 and also turns off the transfer control signals other than the transfer control signal $\phi$TG3 before the operation proceeds to step S311.

In step S311, the CPU 17 judges as to whether or not at the time count has reached the end of the exposure period (the charge storage period). If the time count has not yet reached the end of the exposure period, the CPU 17 makes an affirmative judgement in step S311 to return to step S304, whereas the CPU 17 makes a negative judgement in step S311 if the time count has reached the end of the exposure period to proceed to step S312. In step S312, the CPU 17 turns off all the transfer control signals before the operation proceeds to step S313. In step S313, the CPU 17 turns off the exposure control signal and turns on the output control signal to scan the charges stored at the FD units of the image sensor 12 and also starts reading out the image signals before proceeding to step S314. In step S314, the CPU 17 performs A/D conversion on the image signals that have been read out and then the operation proceeds to step S315. In step S315, the CPU 17 stores into the memory the image signals having undergone the A/D conversion and then the operation proceeds to step S316. In step S316, the CPU 17 turns off the output control signal, records the image signals stored in the memory at the recording medium and also displays the image signals at the display device. Then, the CPU 17 ends the processing shown in FIG. 14 and returns to the processing in FIG. 12.

As explained in detail above, the digital still camera in the embodiment is capable of obtaining a clear image with no blur by implementing switching control on the charge transfer routes from the photoelectric conversion element group to the charge storage element group at the image sensor 12 in response to an unsteady hand movement.

Since the vibration-proofing method adopted in the embodiment is achieved by simply electrically switching the charge transfer routes from the photoelectric conversion elements to the charge storage elements in response to an unsteady hand movement occurring during the exposure operation, the exposure operation can be performed continuously without any interruption. Furthermore, it does not require any additional memory to perform the vibration-proofing operation or any image processing to be performed during the vibration-proofing operation.

(Variations of the Embodiment)

The present invention is not limited to the embodiment explained above and allows for a number of variations and modifications as explained below.

Figures 15A, 15B:
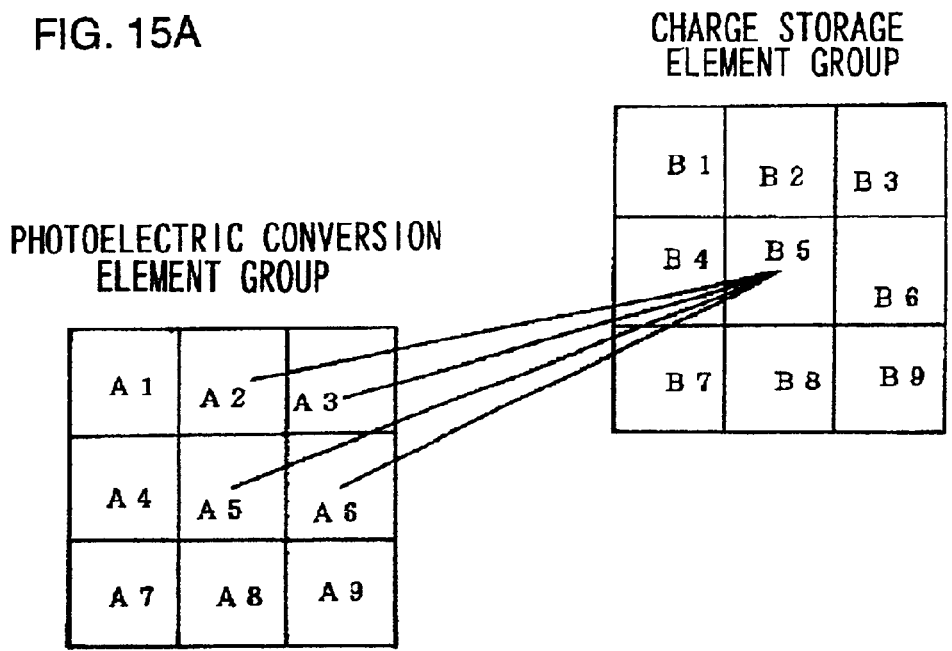
FIG. 15A illustrates charge transfer routes.
FIG. 15B illustrates charge transfer routes.

The embodiment described above assumes a structure in which four adjacent photoelectric conversion elements (e.g., A2, A3, A5 and A6) are linked to a single charge storage element (e.g., B5) as shown in FIG. 15A and four adjacent storage elements (e.g., B4, B5, B7 and B8) are linked to a single photoelectric conversion element (e.g., A5). Instead, a structure achieved by linking nine adjacent photoelectric conversion elements (e.g., A1~A9) to a single charge storage element (e.g., B5) as shown in FIG. 16A and linking nine adjacent charge storage elements (e.g., B1~B9) to a single photoelectric conversion element (e.g., A5) as shown in FIG. 16B may be adopted.

In such a case, a selection is made from the nine charge transfer routes in conformance to the direction and the extent of the displacement of the subject image occurring on the image sensor due to an unsteady hand movement. For instance, with D representing a positive constant, a decision is made with regard to the hand movement signal Xk representing the displacement along the X axis as to which of the three ranges below the value indicated by the hand movement signal Xk falls into;

1. Xk>D
2. D≧Xk>−D
3. −D≧Xk

Likewise, a decision is made with regard to the hand movement signal Yk representing the displacement along the Y axis as to which of the following three ranges the value indicated by the hand movement signal Yk falls into.

1. Yk>D
2. D≧Yk>−D
3. −D≧Yk

By performing the "three stages x three stages" decision-making in this manner, it becomes possible to select a single charge transfer route among the nine charge transfer routes.

The charge transfer routes may be constituted of MOS gates, as shown in FIG. 3, or the charge transfer routes may be constituted by combining aluminum wire and MOS switches. In this case, by increasing the number of charge transfer routes from which a selection is made, an image blur caused by a large hand movement can be more effectively prevented.

Figure 17:
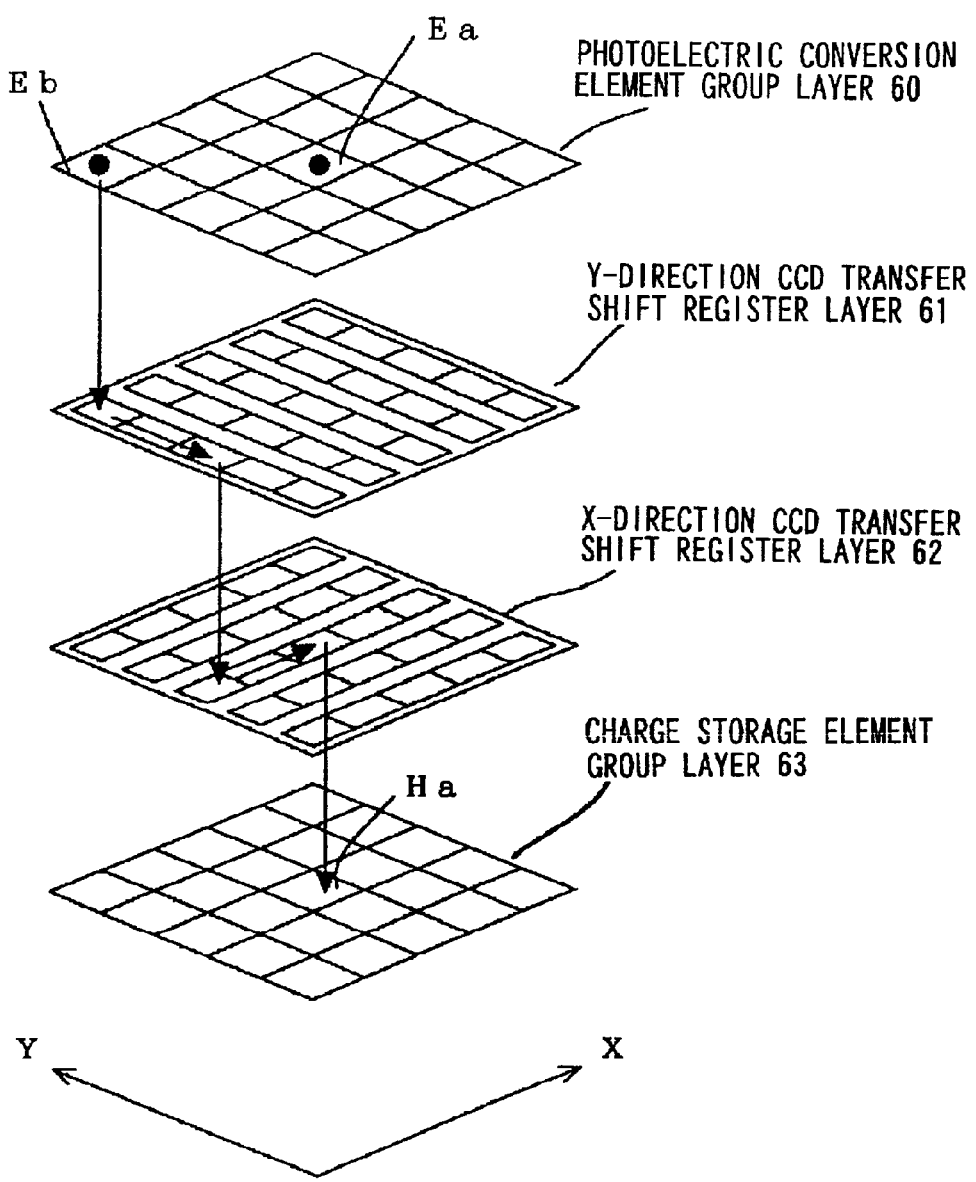
FIG. 17 shows the structure adopted in the image sensor in another embodiment of the present invention.

An example in which a MOS gate is utilized to switch the charge transfer route has been explained in reference to FIG. 2. Instead, a shift register such as a CCD that allows charge transfer may be utilized. FIG. 17 presents an example of an image sensor constituted by using a shift register. The image sensor in FIG. 17 includes a photoelectric conversion element group layer 60, a Y-direction CCD transfer shift register layer 61, an X-direction CCD transfer shift register layer 62 and a charge storage element group layer 63 and is formed as a laminated semiconductor through three-dimensional integrated circuit technology. The Y-direction CCD transfer shift register layer 61 and the X-direction CCD transfer shift register layer 62 in this image sensor each allow electrical charges to be transferred in both the+ direction and the—direction through control implemented on the phase of a transfer clock.

If an unsteady hand movement occurs during the exposure period, the charges generated at the photoelectric conversion element group layer 60 are first transferred in parallel to the Y-direction CCD transfer shift register layer 61 and they are transferred to an extent corresponding to the Y-direction component of the hand movement signal at the Y-direction CCD transfer shift register. The charges having been transferred along the Y direction are then transferred in parallel from the Y-direction CCD transfer shift register layer 61 to the X-direction CCD transfer shift register layer 62 and they are further transferred to an extent corresponding to the X-direction component of the hand movement signal at the X-direction CCD transfer shift register. The charges having been transferred along the X direction are transferred in parallel from the X-direction CCD transfer shift register layer 62 to the charge storage element group layer 63 where they are stored. The transfer/storage operation described above is performed each time the hand movement signal indicates a change to an extent expressed in units of the size of the individual photoelectric conversion elements during the exposure period. When the exposure period is over, the charge storage element group layer 63 is scanned and image signals are output.

Now, an explanation is given on an example in which an image present on a photoelectric conversion element Ea at the exposure start has moved onto a photoelectric conversion element Eb due to an unsteady hand movement occurring during the exposure period. The photoelectric conversion element Eb is distanced from the photoelectric conversion element Ea by −2 elements along the X direction and +2 elements of along the Y direction. The electrical charge generated at the photoelectric conversion element Eb is transferred to the Y-direction CCD transfer shift register layer 61 where it is shifted by an extent matching −2 elements along the Y direction. Next, this charge is transferred to the X-direction CCD shift register layer 62 where it is shifted to an extent matching +2 elements along the X direction. The charge is then transferred to the charge storage element layer 63 where it is stored at a charge storage element Ha.

By varying the shift quantities at the CCD transfer shift registers in correspondence to the extent of the unsteady hand movement, the charge transfer routes can be switched and, as a result, even when a serious hand movement occurs, image signals that do not manifest any image blur can be obtained with a high degree of reliability.

While an explanation is given above by assuming that an image blur occurs as a result of a change in the angle of the photographic optical system, the adverse effect of the so-called parallel blur caused by a parallel shift of the optical axis of the photographic optical system also becomes significant in a close-up photographing operation. This problem may be eliminated by detecting the parallel blur with an acceleration sensor for parallel blur detection and obtaining a blur signal based upon the detected parallel blur.

In addition, the sensors utilized for hand movement detection are not limited to the angular speed sensors explained earlier and may be constituted by using acceleration sensors or image sensors (sensors that detect changes occurring in the subject image over time).

While the image sensor control operation is constantly performed in order to prevent an image blur after a shutter release signal is input in the explanation given above, the image blur preventing operation may be performed only in a situation prone to image blur. For instance, an image sensor control operation may be performed to prevent image blur depending upon the operating mode setting of the digital still camera (e.g., the close-up photographing mode in which a camera operation suited for close-up photographing is performed and a high resolution recording mode in which a low compression rate is set for recording the image) or when the distance set at the photographic optical system is shorter than a predetermined value. Since the blur preventing operation is automatically performed only in a situation prone to image blur in this case, it is possible to prevent the camera response from becoming poor during the photographing operation due to the image sensor control processing.

While an explanation is given above on an example in which the present invention is adopted in a digital still camera, the present invention may be adopted in a wide range of applications in conjunction with apparatuses other than digital still cameras that capture images by utilizing charge storage type image sensors.

In the embodiment described above, the image sensor is constituted by connecting the photoelectric conversion element group and the charge storage element group through a plurality of charge transfer routes and an image blur is prevented by selecting (switching) appropriate charge transfer routes at the image sensor in response to an unsteady hand movement. The image sensor according to the present invention may be utilized for purposes other than the prevention of image blur, as well. For instance, image processing such as digital filtering implemented on image data read out from an image sensor and the relative position shift at the image sensor performed to achieve a higher resolution of the image as disclosed in Japanese Laid-Open Patent Publication No. H 11-225284 can be executed within the image sensor according to the present invention which allows selection of a plurality of charge transfer routes.

When utilizing the image sensor according to the present invention to implement digital filtering, the plurality of charge transfer routes through which the photoelectric conversion elements and the charge storage elements are linked should be selectively connected in conformance to the length of time corresponding to the size of the coefficient of the digital filter.

In addition, when utilizing the image sensor according to the present invention to improve the image resolution, the plurality of charge transfer routes through which the photoelectric conversion elements and the charge storage elements are connected should be intermittently switched during the period in which the photoelectric transfer elements undergo exposure.

Figure 21:
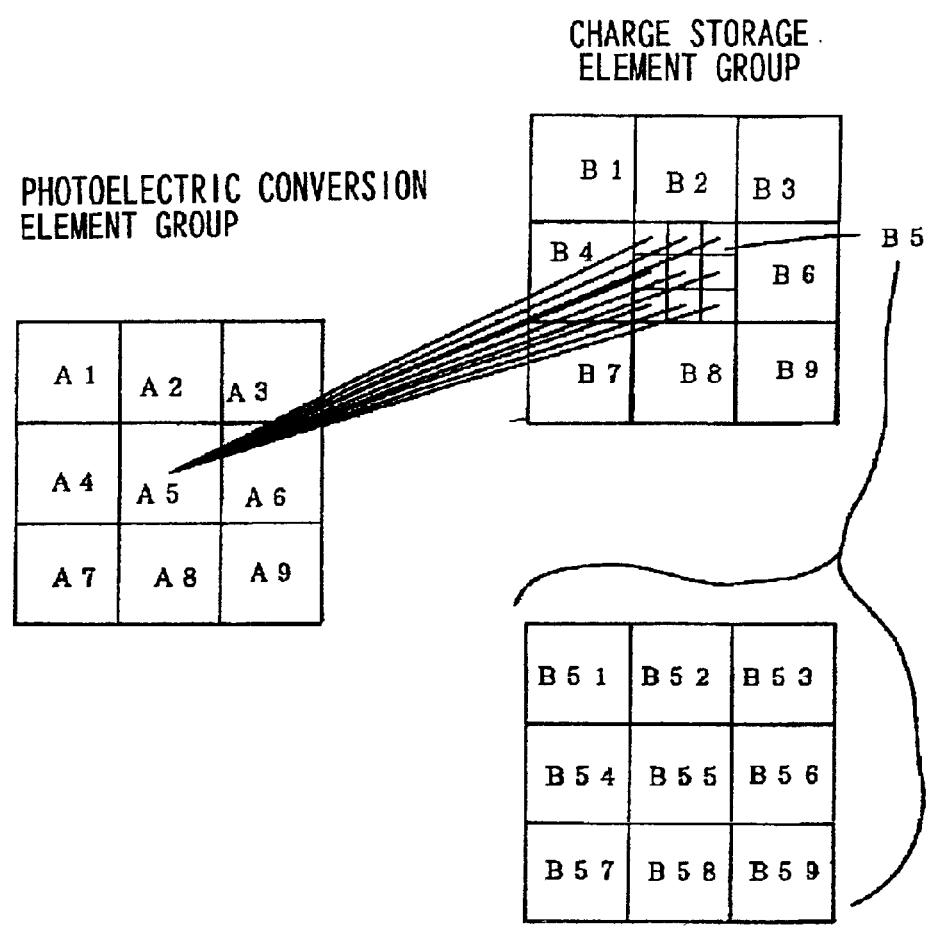
FIG. 21 illustrates charge transfer routes.

In the image sensor achieved in the embodiment of the present invention, a single charge storage element is connected a plurality of photoelectric conversion elements through charge transfer routes, i.e., a plurality of photoelectric conversion elements share a common charge storage element, as shown in FIG. 15A. Instead, each photoelectric conversion element (e.g., A5) may be individually connected with a plurality of charge storage elements independent of one another (e.g., B51, B52, B53, B54, B55, B56, B57, B58 and B59) via different charge transfer routes as shown in FIG. 21. By selecting (switching to) the correct charge transfer routes in correspondence to a specific hand movement, storing the charges generated as a result of different hand movements at different charge storage elements and synthesizing the signals read out from the various charge storage elements after the exposure period ends, image signals which do not manifest image blur can be generated. During the synthesis processing, the charges stored at the individual charge storage elements B51, B52, B53, B54, B55, B56, B57, B58 and B59, for instance, may be added together to use the sum as the charge signal corresponding to a single photoelectric conversion element (A5 in this case).

As described above, the image sensor according to the present invention achieves a structure which allows the charges generated at a plurality of adjacent photoelectric conversion elements to be transferred to a single common charge storage element and the electrical charge generated at the single common photoelectric conversion element to be transferred to a plurality of adjacent charge storage elements by connecting the photoelectric conversion element group and the charge storage element group through a plurality of charge transfer routes in a multiplexed relationship. As a result, the various functions achieved through a mechanical image sensor displacement (positional shift) or through software post processing in related art can be instantaneously realized simply by electrically switching the plurality of charge transfer routes during the exposure period at the photoelectric conversion elements.

What is claimed is:

1. An image-capturing apparatus comprising:
   a photoelectric conversion element group that captures a subject image with a plurality of photoelectric conversion elements arrayed in a two-dimensional arrangement and individually generates electrical charges at said photoelectric conversion elements;
   a charge storage element group having a plurality of charge storage elements which store the electrical charges generated at said photoelectric conversion element group;
   a charge transfer route group that connect individual photoelectric conversion elements constituting said photoelectric conversion element group to said plurality of charge storage elements constituting said charge storage element group through different transmission routes;
   an output circuit that outputs image signals corresponding to quantities of the electrical charges stored at said charge storage element group;
   a blur detection circuit that detects a blur occurring at said image-capturing apparatus and outputs a detection signal; and
   a route switching control circuit that selects charge transfer routes at said charge transfer route group in conformance to the detection signal output by said blur detection circuit.

2. An image-capturing apparatus according to claim 1, wherein:
   said route switching control circuit calculates through an arithmetic operation an extent and a direction of a displacement of the subject image occurring on said photoelectric conversion element group in conformance to the detection signal output by said blur detection circuit to select charge transfer routes so as to connect said photoelectric conversion elements to said charge storage elements based upon the results of an arithmetic operation.

3. An image-capturing apparatus according to claim 2, wherein:
   said route switching control circuits selects; (1) a charge transfer route so as to connect a photoelectric conversion element to a charge storage element corresponding to said photoelectric conversion element if the extent of the displacement is smaller than a pitch at which said photoelectric conversion elements are arrayed; and (2) a charge transfer route so as to connect said photoelectric conversion element to a charge storage element at a position reflecting the direction and the extent of the displacement relative to a position of said charge storage element corresponding to said photoelectric conversion element if the extent of the displacement is equal to or larger than the arraying pitch.

4. A camera having;
   an image-capturing apparatus according to claim 1; and
   a photographic optical system that forms a subject image at said photoelectric conversion element group.

5. An image-capturing apparatus comprising:
   a photoelectric conversion element group that captures a subject image with a plurality of photoelectric conversion elements arrayed in a two-dimensional arrangement and individually generates electrical charges at said photoelectric conversion elements;
   a charge storage element group having a plurality of charge storage elements which store the electrical charges generated at said photoelectric conversion element group;
   a charge transfer route group that connects photoelectric conversion elements adjacent to one another in said photoelectric conversion element group to a charge storage element in said charge storage element group corresponding to said adjacent photoelectric conversion elements through different charge transfer routes;
   an output circuit that outputs image signals corresponding to quantities of the electrical charges stored at said charge storage element group;
   a blur detection circuit that detects a blur occurring at said image-capturing apparatus and outputs a detection signal; and
   a route switching control circuit that selects charge transfer routes at said charge transfer route group in conformance to the detection signal output by said blur detection circuit.

6. An image-capturing apparatus according to claim 5, wherein:
   said route switching control circuit calculates through an arithmetic operation an extent of displacement of the subject image occurring on said photoelectric conversion element group along a direction in which said photoelectric conversion elements are provided adjacent to one another, in conformance to the detection signal output by said blur detection circuit, to select a charge transfer route so as to connect one of said adjacent photoelectric conversion elements to said charge storage element in conformance to the extent of the displacement.

7. An image-capturing apparatus according to claim 6, wherein:
   said photoelectric conversion elements are constituted of photodiodes;

said charge storage elements are each constituted of a floating diffusion unit; and said charge transfer routes are constituted of MOS transistors formed between said photodiode and said floating diffusion unit.

8. An image-capturing apparatus according to claim 6, wherein:

said photoelectric conversion elements each constitute a CCD light-receiving unit;

said charge storage elements each constitute a CCD storage unit; and said charge transfer routes are constituted of a CCD transfer shift register with a direction and a quantity of a shift thereof controlled by said route switching control circuit.

9. An image-capturing method, comprising:

capturing a subject image at a photoelectric conversion element group having a plurality of photoelectric conversion elements arrayed in a two-dimensional arrangement;

detecting a blur occurring at said photoelectric conversion element group;

calculating an extent and a direction of a displacement of the subject image occurring on said photoelectric conversion element group through an arithmetic operation based upon the blur;

switching a charge transfer route group that connects individual photoelectric conversion elements constituting said photoelectric conversion element group to a plurality of charge storage elements constituting a charge storage element group through transmission routes different from one another in correspondence to the extent and the direction of the displacement;

storing charges output from said photoelectric conversion element group at said charge storage element group; and outputting image signals in correspondence to quantities of the electrical charges stored at said charge storage element group.

* * * * *